Patented May 4, 1954

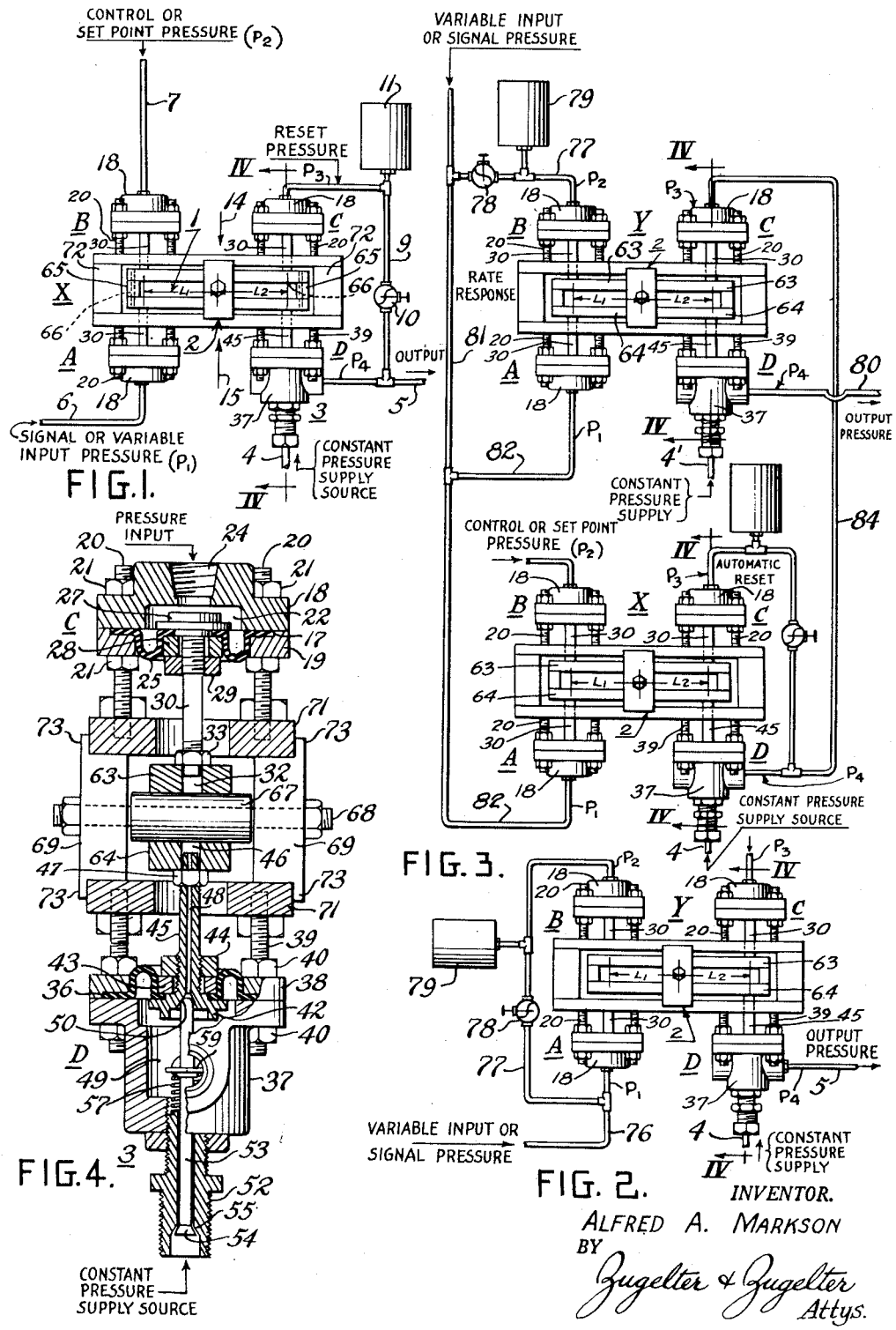

2,677,385

UNITED STATES PATENT OFFICE 2,677,385

REGULATING APPARATUS PROVIDING PROPORTIONAL BAND REGULATION WITH AUTOMATIC RESET AND RATE OF ACTION RESPONSE TO INPUT SIGNAL

Alfred A. Markson, Mount Lebanon Township, Allegheny County, Pa., assignor to Hagan Corporation, Pittsburgh, Pa., a corporation of Pennsylvania Application April 26, 1950, Serial No. 158,278

11 Claims. (Cl. 137—86)

This invention relates to regulating apparatus and more particularly to apparatus adapted to provide proportional band regulation and provided with means for automatically resetting the apparatus to its set or regulating point, said apparatus also having means for modifying the rate of action response to the rate of change of the input signal or pressure.

An object of this invention is to provide regulating apparatus that is responsive to a plurality of input pressures one of which may be a variable input signal or input pressure, and another of which is an output regulating pressure, the apparatus being so constructed and arranged that it will provide proportional band regulation and automatically reset to the control point thereof when a condition to be regulated has been reestablished or returned to a value corresponding to or required by the control or set point thereof.

Another object of the invention is to provide regulation apparatus of the character referred to above that is provided with means for modifying the output or regulating pressure in accordance with the rate of change of the input signal or pressure from one value to another.

A still further object of the invention is to provide regulating apparatus such as referred to above, having means for modifying the output signal or pressure in accordance with an adjustable ratio between the input pressures and the output pressure so long as the input pressure or signal is at variance with the set or control point of the apparatus.

The above and other objects of the invention will be apparent from the following description taken in conjunction with the accompanying drawings, in which:

Figure 1 is a view in side elevation of an adjustable ratio regulator provided with automatic reset and embodying a form of the invention;

Fig. 2 is a view of a device similar to the device of Fig. 1, provided with means for causing the output pressure to vary in accordance with the rate of change of the input pressure or signal from one value to another;

Fig. 3 is a view of regulating apparatus embodying the devices of Figs. 1 and 2, the two devices being so connected that the combined effects thereof will provide proportional band regulation with the automatic resetting of the apparatus to the control point and modification of the output or regulating pressure in accordance with the rate of change of the input signal or pressure; and Fig. 4 is a view in section taken on line IV—IV on any one of Figs. 1, 2, and 3, respectively.

Throughout the drawings and the specification like reference characters indicate like parts.

In Fig. 1 of the drawings, a device X is shown that comprises a beam 1 provided with a double-acting fulcrum 2 and a plurality of stationarily mounted pressure-receiving units A, B, and C and a combination pressure-receiving and sending unit D. Units A, B and C are preferably identical in construction and are so illustrated. Unit D differs from units A, B and C in that it embodies a valve 3 for controlling the transmission of pressure from a supply pipe 4 into unit D from which the pressure is transmitted to a sending line 5. The pressure in supply pipe 4 may be a fluid pressure such as compressed air and is supplied to the pipe at a predetermined constant pressure, say, for example, 60 lbs. per sq. in. gage.

Since units A, B and C are similar, the sectional view of Fig. 4 suffices to illustrate the details of construction of each of units A, B and C, as well as unit D. Pressure is supplied to units A and B through pipes 6 and 7, respectively, the pressures in these pipes representing input pressures or signals. The pressure supplied to unit B may be either a variable or a constant pressure. If a constant pressure is supplied to unit B, this pressure serves as the set or control point of the regulator, in which case the pressure supplied to unit A through pipe 6 represents the input or signal pressure to the device. The signal pressure varies in accordance with changes in a condition to be controlled or regulated by the output pressure of unit D, the regulator being in a steady state of balance when the input signal to unit A is equal to the input or control point pressure for unit B.

Units C and D are interconnected through an interchange pipe 9 in which is disposed a restriction or orifice 10. This restriction, for example, may be an adjustable needle valve, whereby the rate of interchange of pressure fluid between units C and D may be adjusted. To give ballast to the interchange connection, a volume chamber 11 may be provided. Volume chamber 11 is a closed pressure-tight chamber the interior of which is connected to the interchange pipe 9 at a point between needle valve 10 and unit C. Units C and D being interconnected as shown, unit C together with the needle valve 10 and chamber 11 function as an automatic reset for the regulator.

Units A and B are positioned to act on beam 1 on the same side of fulcrum 2 and to exert opposing forces on the beam. Unit A acts on the beam in a direction to turn it clockwise with respect to fulcrum 2, while unit B is arranged to exert a force on the beam tending to turn it counter-clockwise. Since units A and B act on lever 1 at the same distance from the center of fulcrum 2, the distance from the points of action of units A and B on beam 1 to the center of fulcrum 2 may be designated as lever arm $L_1$.

Units C and D are disposed on the opposite side of fulcrum 2 and are so placed that they exert opposing forces on beam 1. For example, unit C acts in a direction to turn beam 1 clockwise about its fulcrum, while unit D acts to turn the beam counter-clockwise. Units C and D act on beam 1 at the same distance from fulcrum 2 and the distance from the center of the fulcrum to the points where units C and D exert force on the beam, may be designated as lever arm $L_2$.

As stated above, fulcrum 2 is double-acting. By this is meant that if the preponderance of the forces of units A, B, C, and D is in the direction of arrow 14, the beam bears downwardly on the fulcrum and the fulcrum exerts an equal and opposite reaction force. Conversely, if the preponderance of the forces is in the direction of arrow 15, then beam 1 pushes upwardly on the fulcrum and the reaction force of the fulcrum is equal and opposite.

As shown in Fig. 4, units A, B and C each comprise a diaphragm 17, a bonnet or housing 18, and a clamp ring 19 between which the marginal edge of the diaphragm is clamped by means of stud bolts 20 and nuts 21. The housing 18 has a cavity 22 that forms with the diaphragm 17 a pressure-tight chamber. The bonnet is provided with a tapped opening 24 to which an input pressure pipe may be connected. The central portion of diaphragm 17 is rigid and between this rigid portion and the clamped marginal edge of the diaphragm is a slack portion 25. The rigid central portion is formed by the flanged head 27 of a bolt, and clamp ring 28 between which the central portion of the diaphragm is tightly clamped by means of a nut 29 threaded on the bolt, as shown. The bolt is provided with an extended stem portion 30 that engages beam 1. Beam 1 may be provided with a socket or aperture 32 for accommodating the engaging end of stem 30 which fits loosely into the socket. The force exerted by the diaphragm through stem 30, on beam 1 is transmitted by means of a nut 33 threaded on stem 30, as shown. Since nut 33 is threaded on the stem it may be utilized in part, at least, as an adjustment for the effective area of diaphragm 17, as will be explained infra.

As illustrated in Fig. 4, unit C and units A and B are mounted on studs 29, whereby each unit including the diaphragm thereof, may be moved bodily upwardly or downwardly on the studs to thereby adjust the slack portion of the diaphragm and consequently the effective area thereof. If a bonnet 18 and its diaphragm 17 are moved on the studs in a direction to adjust the central portion of diaphragm inwardly of cavity 22, the slack portion is so modified that the effective diameter of the diaphragm is increased. By adjusting the bonnet and diaphragm in the opposite direction the effective area of the diaphragm is decreased. Because of the adjustable mountings of units A, B and C and unit D, the effective areas of the diaphragms of units A, B, C and D may be independently adjusted to equality with each other. Thus, if it is desired that each diaphragm shall have an effective unit area of, say, 1 sq. in., then these diaphragms are adjusted as above described, so that the force exerted by any one diaphragm at a given pressure will be equal to the force of any other diaphragm at the same pressure. By adjusting nut 33 on stem 30 the area of any one of diaphragms 17 may be adjusted also.

Unit D comprises a diaphragm 36, the marginal edge of which is clamped between a bonnet or housing 37 and a clamp or base ring 38 by means of studs 39 and nuts 40. The central portion of diaphragm 36 is rigid, being made so by clamping the central portion thereof between the flanged head 42 of a bolt and a clamp ring 43, the clamp ring and head 42 being drawn up tightly by means of a nut 44. As shown, the stem 45 of the bolt is long enough so that it will engage beam 1, the free end thereof being received in a socket 46 in the beam. A nut 47 transmits the thrust of stem 45 to the beam, and this nut is adjustable in position on the stem.

Since the bolt forms a part of valve 3, the stem thereof is provided with a bore 48 that communicates with the atmosphere at its free end with the interior of chamber 49 of bonnet 37 at its inner end. A valve seat 50 is formed in the head 42 which serves as an exhaust port for the valve.

Valve 3 comprises a body 52 that is threaded into the bonnet 37, and a valve stem 53. Stem 53 is provided with a valve element 54 at its outer end disposed to seat on a valve seat 55 constituting the inlet port of valve body 52. The inner end of valve stem 53 seats in valve seat 50 and is disposed to control the covering or uncovering of the exhaust port. Valve stem 53 may be urged in a direction to seat valve element 54 on the inlet port seat 55 by means of a light compression spring 57 disposed about the valve stem and between a collar 59 mounted on the stem and the inner end of the valve body 52 as shown.

Pressure supply pipe 4 is connected to the outer end of the valve body 52, as shown in Figure 1. When pressure is supplied to chamber 49 of bonnet 37, the force of this pressure tends to move the exhaust port seat 50 away from the adjacent end of valve stem 53. If the resisting force of the beam is less than the force developed by the pressure acting on diaphragm 36 of unit D the exhaust port seat 50 will be uncovered, thereby allowing pressure to exhaust to the atmosphere through passageway 48 until the resisting force of the beam and the opposing force of diaphragm 36 are in balance. At that instant the exhaust port seat 50 is closed by valve stem 53. If the force or forces acting on the beam are such as to move the diaphragms 17 inwardly of housing 37, valve stem 53 is moved in a direction in which the valve element 54 is lifted off the inlet port seat. When the valve inlet port is open, fluid under pressure from the supply pipe 4 flows into chamber 49 until the force of the pressure acting on the diaphragm 36 thereof is sufficient to equalize the external force imposed on the diaphragm through beam 1. When these forces are equalized, both the inlet and exhaust ports are closed.

So long as the inlet port seat 55 is uncovered the pressure in chamber 49 will increase until the pressure therein is equal to the pressure of the supply source unless the valve is closed at a lower pressure. Conversely, so long as the exhaust port is open, assuming there is positive pressure in chamber 49, pressure will exhaust therefrom until the pressure therein is equal to zero gage pressure unless, before the pressure is thus reduced, the port is closed by an external force applied through beam 1. The rate at which pressure builds up in chamber 49 or is exhausted therefrom depends upon the degree or extent to which the respective inlet and exhaust ports are opened, neither of which is open at the same time, but both of which are closed when the diaphragm is in balance with the external forces applied thereto through beam 1.

Beam 1 comprises spaced parallel bars 63 and 64, the bars being spaced by means of spacer blocks 65 disposed between the bars at the opposite ends thereof. The ends of bars 63 and 64 and the spacer blocks 65 are firmly secured together by means of dowel pins or other suitable means indicated at 66.

Fulcrum 2 comprises a roller 67 mounted to rotate on an axle 68, the opposite ends of which are supported in blocks 69. As shown, support blocks 69 are placed between spaced parallel frame plates 71 that are secured at their ends to spacer blocks 72, as shown. At the upper and lower ends of the blocks 69, flanges 73 are provided that engage the vertical faces of the frame plates as shown. Blocks 69, together with fulcrum roller 67 and its axle 68 may be moved longitudinally of the frame and the beam whereby the lengths of lever arms $L_1$ and $L_2$ may be adjusted, according to the operating characteristics required of the device. Lever arms $L_1$ and $L_2$ may be made equal or they may be so adjusted that lever arm $L_1$ is greater than or less than lever arm $L_2$. As shown, units A, B, C and D are secured to frame plates 71 by means of the stud bolts 20 and 39.

If it be assumed that the pressures supplied to chamber 22 of each of the respective units A, B and C of the device of Figure 1, be designated $P_1$, $P_2$ and $P_3$, respectively, and that the output or regulating pressure established in chamber 49 of unit D be designated $P_4$, and assuming that the effective areas of the diaphragms 17 of units A, B and C and diaphragm 36 of unit D, are unit areas, then the equation illustrating that the sum of the moments of the forces of pressures $P_1$, $P_2$, $P_3$ and $P_4$ about fulcrum 2 is equal to zero, may be written as follows:

$P_1L_1 - P_2L_1 + P_3L_2 - P_4L_2 = 0$; therefore $$P_4 = \frac{L_1}{L_2}(P_1 - P_2) + P_3$$

If $L_1 = L_2$ then $P_4 = P_1 - P_2 + P_3$

If the ratio of the lever arms $L_1$ and $L_2$ is made greater than or less than 1 by adjusting the position of fulcrum 2, it will be seen from the above equation that the change in the lever arm lengths effects the portion $(P_1 - P_2)$ of the equation, and consequently the magnitude of pressure $P_4$.

When device X of Figure 1 is in balance, that is, when the signal pressure $P_1$ is equal to the control point or set point pressure $P_2$, then pressures $P_3$ and $P_4$ will become equal. When that condition obtains, fulcrum 2 has no effect on the device, because being in a state of balance beam 2 is supported on stems 30 and 45 of units A and D. However, when there is a change in the signal pressure $P_1$, the fulcrum becomes immediately effective and the force exerted on the fulcrum will be in the direction of the predominant forces acting on the beam. That is, the force on the fulcrum will be either in the direction of arrow 14 or arrow 15.

When there is a difference between the value of the signal pressure $P_1$ and the control or set point pressure $P_2$, the output pressure $P_4$ may vary from the minimum pressure which is zero gage pressure, to the maximum pressure in the supply pipe 4, depending upon the length of time required for the regulator that responds to the output pressure $P_4$ to readjust conditions that will restore the signal pressure $P_1$ to equality with the set or control point pressure $P_2$. As long as there is a difference between pressures $P_1$ and $P_2$ there will be a difference between pressures $P_4$ and $P_3$; but pressures $P_4$ and $P_3$ will finally become equalized when the signal pressure $P_1$ equals the control point pressure $P_2$. The particular rate at which the resetting action of unit C, the needle valve or restriction 10 and chamber 11 functions, is dependent upon setting of the needle valve and the volume of chamber 11.

In Fig. 2, a device Y is shown that may be similar in all respects to device X of Figure 1, therefore, corresponding and similar parts will be designated by the same reference characters. The signal or input pressure $P_1$ to device Y is supplied through a pipe 76. A pressure interchange connection 77 is connected to pipe 76 and to the chamber of unit B. In connection 77 is a restriction or orifice such as a needle valve 78. To provide certain desirable characteristics to the interchange connection, the volume chamber 79, similar to the ballast chamber 11, may be connected to pipe 76 at a point between needle valve 78 and the inlet to bonnet 18 of unit B. A pressure $P_3$ may be supplied to the bonnet of unit C. This pressure may be a constant pressure or a variable pressure such as the signal pressure for unit A.

If no pressure is supplied to unit C and a signal pressure of increasing magnitude is transmitted to unit A, beam 1 will turn clockwise, whereby the valve of unit D will be opened and a pressure established therein and in the sending or output pipe 5 thereof. Because of the interchange connection the pressure in unit B will after a certain time interval, become equalized with the pressure in unit A. When the pressures in units A and B have become equalized, the pressure in unit D will be decreased to zero gage. If there is pressure $P_3$ in unit C, the pressure in unit D will be of a value that balances pressure $P_3$. If the signal pressure from pipe 76 is connected to unit C as well as to units A and B the pressure $P_4$ in unit D will be equal to pressure $P_3$ when pressures $P_1$ and $P_2$ acting on units A and C have been equalized. If changes in the value of the signal pressure delivered to units A and C are slow and gradual, unit D will in effect merely repeat the signal pressure as imposed on the unit C because units A and B equalize each other. If the signal pressure changes quickly, the rate of response of device Y as reflected in the pressure sent out by unit D will be correspondingly high.

The equation which satisfies the condition that the sum of the turning moments of the forces exerted by units A, B, C, and D, on beam 1 of device Y are zero (the beam being then in balance with the forces acting thereon), is the same as the equation given above in connection with Figure 1.

In Fig. 3 a regulating apparatus embodying the automatic reset and regulating features of device X and the rate of action response of device Y, is shown. As there illustrated, the output pressure of unit D of device X is delivered from supply pipe 4 through unit D to the chamber of bonnet 19 of unit C of device Y. The output or regulating pressure of unit D of device Y is delivered from a supply pipe 4' into unit D and transmitted to a sending or control line 80. The pressure in supply pipe 4' may be a fluid pressure such as compressed air maintained at a pressure of 60 pounds per sq. in. for example. The control or set point pressure of the regulating apparatus is imposed on the diaphragm of unit B of device X and the signal pressure, i. e., the pressure that varies in accordance with the condition to be controlled by the output pressure delivered to line 80, is delivered directly to the diaphragm chambers of units A of devices X and Y, through a pipe 21 and branch pipes 82. The diaphragm chamber of unit B of device Y is connected to the signal line 81 through branch pipe 77 in which is located needle valve 78 and the volume or ballast chamber 79.

If it be assumed that the signal pressure delivered to unit A of device X is in balance with the set point or control point pressure as delivered to unit B thereof, then units X and Y will be in a state of balance and the output or regulating pressure delivered to line 80 will be that required to hold the variable condition represented by the signal pressure at the set or control point value. If, for example, the signal pressure increases above the set or control point pressure as imposed on the diaphragm of unit B, device X, beam 1 will turn clockwise causing the valve of unit D to open and transmit an increased pressure through pipe 84 to the diaphragm chamber of unit C of device Y. The pressure delivered by device X to unit C of device Y, will serve to further increase the inlet port opening of the valve in unit D of device Y and cause correspondingly increased pressure to be delivered to the control pressure line 80. When the pressure in unit A of device Y is greater than the pressure in unit B thereof, the effect of device Y is additive to that produced by the output pressure of unit D of device X. As soon as the signal pressure equalizes on the diaphragms of units A and B of device Y, unit D of device Y will merely repeat the output pressure of unit D of device X. So long as the signal pressure $P_1$ remains unequal to the control or set point pressure $P_2$, then the output pressure of unit D of device X and consequently the output pressure of unit D of device Y will continue to change until the regulating apparatus comprising devices X and Y has been reset to the control point. This occurs when the signal input pressure $P_1$ is equal to the control point pressure $P_2$ as imposed on unit B of device X.

If the signal pressure $P_1$ changes slowly and gradually as it departs from the control point pressure either in a direction above or below the control point pressure, the rate of action response of device Y will not materially modify the output of unit D of device Y because the output of unit D of device Y will merely be a repetition of the output of unit D of device X. However, if the signal pressure departs from the control point value (pressure $P_2$ of device X) the rate of action response of device Y will function according to the rate of change or departure of the signal input pressure from the set or control point pressure or at the rate at which the signal input pressure changes from one value to another. The output pressure $P_4$ required to bring the signal pressure $P_2$ back to equality with the control point pressure will therefore be effected quickly and accurately.

From the above description, it will be apparent that the rate of response of device Y may be modified by adjusting the relative lengths of lever arms $L_1$ and $L_2$ thereof. By changing the lever arm lengths $L_1$ and $L_2$ of device X the effect of a change in $(P_1-P_2)$ on the output pressure of unit D therefor may be modified according to the operating characteristics required in practice.

It will also be apparent from the foregoing that the regulating apparatus of Fig. 3 provides a means whereby a condition may be regulated to a set or control point as the regulating apparatus is provided with an automatic reset and that also the apparatus is provided with a rate of response modification whereby the output or regulating pressure may be caused to vary at a rate that is commensurate with the rate of change in the signal pressure as well as in deviation of the input signal or pressure from the set point pressure thereof.

The adjustable fulcrum 2 embodied in devices X and Y functions whenever the forces acting on the beam are such that beam is turned on the fulcrum in one direction or the other. When the sum of the moments of these forces about the fulcrum are zero the fulcrum has no effect on the beam. The fulcrum becomes effective when it is required to be and being adjustable the effect of the fulcrum can be adjusted as desired to meet operating conditions.

Having thus described the invention, it will be apparent to those skilled in this art that various modifications and changes may be made in the details of construction and arrangement of parts without departing from either the spirit or the scope of the invention.

Therefore, what is claimed and desired to be secured by Letters Patent is:

1. A regulating apparatus comprising devices X and Y arranged to respond to a plurality of input pressures and develop a regulating output pressure, devices X and Y each comprising a beam having a double-acting fulcrum, a pair of pressure receiving housings disposed to one side of the fulcrum, each housing of said pair having a flexible wall disposed to exert opposed forces on the beam at a distance $L_1$ from said fulcrum, a second pair of pressure receiving housings disposed on the other side of the fulcrum, each housing of said second pair having a flexible wall connected to exert opposing forces on said beam at a distance $L_2$ from said fulcrum, a valve actuated by movement of said beam for establishing a regulating pressure in one housing of said second pair, a pressure connection between the housings of said second pair of device X said connection having a flow restriction therein to control the rate of interchange of pressure between the housings of said second pair, the flexible wall in one of the housings of the first pair of device X being responsive to a pressure $P_2$ and the flexible wall of the other housing of said first pair of device X being responsive to a variable signal pressure $P_1$, a pressure connection between the first pair of housings of devicve Y, said connection having a restriction therein to control the rate of interchange of pressures between said housings, one of the housings of the first pair of device X being connected to receive the signal input pressure supplied to device X, and a connection for supplying the output pressure of device X to one of the housings of device Y whose flexible walls act on the beam at distance $L_2$ from the fulcrum, whereby the value of the output pressure of the valve of device Y is caused to respond to the output pressure of device X and to the rate response of device X as determined by the rate of interchange of pressures between the first pair of housings of device Y.

2. Regulating apparatus according to claim 1, characterized by the fact that a hollow pressure-tight member is connected to the interior of the housing of the second pair of housings of device X that receives the regulating output pressure of the opposing unit of said pair.

3. Regulating apparatus according to claim 1, characterized by the fact that a hollow pressure-tight member is connected to the interior of the housing of the second pair of housings of device X that receives the regulating output pressure of the opposing unit of said pair, the hollow member being connected to said housing at a point between said housing and said restriction.

4. Regulating apparatus according to claim 1, characterized by the fact that a hollow pressure-tight member is connected to the interior of the housing of the second pair of device X that receives the regulating output pressure of the opposing unit of said pair, and that a hollow pressure-tight member is connected to receive pressure supplied to the first pair of housings of device Y.

5. Regulating apparatus according to claim 1, characterized by the fact that a hollow pressure-tight member is connected to receive pressure supplied to the housing of the second pair of housings of device X that receives the regulating output pressure of the opposing unit of said pair, and that a hollow pressure-tight member is connected to receive pressure supplied to the first pair of housings of device Y, said hollow member being connected to the interchange connection at a point between said restriction and the housing of device Y that receives pressure after the restriction.

6. Regulating apparatus according to claim 1, characterized by the fact that the beam of device X comprises spaced parallel members rigidly secured together at their opposite ends, that the fulcrum is disposed between and transversely of said members, and that the fulcrum is supported at opposite sides of the beam in support members which are movable longitudinally of the beam.

7. Regulating apparatus according to claim 1, characterized by the fact that the beam of each of devices X and Y comprises spaced parallel members rigidly secured together at their opposite ends, that the fulcrum is disposed between and transversely of said members, and that the fulcrum is supported at opposite sides of the beam in support members which are movable longitudinally of the beam.

8. Regulating apparatus according to claim 1, characterized by the fact that the direction of the forces imposed on the beam by signal receiving unit and the regulating pressure receiving unit of device X act in the same direction on the beam but on opposite sides of the fulcrum.

9. Regulating apparatus according to claim 1, characterized by the fact that the housing of the first pair of housings of device Y corresponding in position to the signal receiving housing of device X receives the pressure signal directly and that the other housing of the first pair of housings of device Y receives the signal pressure through a restriction and that the hollow pressure-tight member is connected to the interchange connection between the restriction and said housing.

10. Regulating apparatus comprising a pressure-responsive force-producing unit adapted to receive a control-point pressure, a pressure-responsive force-producing unit adapted to receive a variable signal pressure, a pressure actuated force-producing and regulating pressure-output sending unit, a beam provided with a double-acting fulcrum, means connecting said control-point and said signal-pressure force-producing units to said beam in force opposing relationship at a distance $L_1$ from said fulcrum, means connecting said regulating pressure-output sending unit to said beam on the opposite side of the fulcrum at a distance $L_2$ therefrom, means responsive to said regulating pressure-output and coupled to said beam at distance $L_2$ from said fulcrum for exerting a resetting force thereon that opposes the force of said regulating pressure-output sending unit, means for controlling the magnitude of said resetting force in accordance with the magnitude of said regulating pressure-output resulting from a difference between said signal pressure and said control point pressure, a control pressure repeating device having a pressure-receiving-and-sending unit provided with means responsive to the pressure-output of said regulating output pressure-sending device for transmitting a repeated regulating pressure that is proportional to said regulating pressure-output, means responsive to the rate of change of said variable signal pressure for causing said repeated pressure to be jointly proportional to said signal pressure and the regulating pressure-output of said sending device, means for rendering said rate of change responsive means ineffective to modify said repeated regulating pressure as the rate of change of the signal pressure approaches zero, and means for adjusting the position of said fulcrum along said beam thereby to modify the ratio of $L_1/L_2$.

11. Regulating apparatus comprising a pressure-responsive force-producing unit adapted to receive a control-point pressure, a pressure-responsive force-producing unit adapted to receive a variable signal pressure, a pressure actuated force-producing and regulating pressure-output sending unit, a beam provided with a double-acting fulcrum, means connecting said control-point and said signal-pressure force-producing units to said beam in force opposing relationship at a distance $L_1$ from said fulcrum, means connecting said regulating pressure-output sending unit to said beam on the opposite side of the fulcrum at a distance $L_2$ therefrom, means responsive to said regulating pressure-output and coupled to said beam at distance $L_2$ from said fulcrum for exerting a resetting force thereon that opposes the force of said regulating pressure-output sending unit on the beam, means for controlling the magnitude of said resetting force in accordance with the magnitude of said regulating pressure-output resulting from a difference between said signal-pressure and said control-point pressure, a control pressure-repeating device having a pressure-receiving-and-sending unit provided with means responsive to the output pressure of said regulating pressure-output sending device for transmitting a repeated regulating pressure that is proportional to the output pressure of said regulating pressure-output sending unit, means responsive to the rate of change of said variable signal pressure for causing said repeated pressure to be jointly proportional to said signal-pressure and the output pressure of said regulating pressure-output sending unit, means for rendering said rate of change responsive means ineffective to modify said repeated regulating pressure as the rate of change of the signal pressure approaches zero, means for adjusting the rate of response of said repeating device to the rate of change of said input signal, and means for adjusting the position of said fulcrum along said beam thereby to modify the ratio of $L_1/L_2$.

References Cited in the file of this patent

UNITED STATES PATENTS

| Number | Name | Date |
| --- | --- | --- |
| 2,073,838 | Hammond | Mar. 16, 1937 |
| 2,247,056 | Howard | June 24, 1941 |
| 2,304,783 | Donaldson | Dec. 15, 1942 |
| 2,505,981 | McLeod | May 2, 1950 |
| 2,633,858 | Eckman | Apr. 7, 1953 |

FOREIGN PATENTS

| Number | Country | Date |
| --- | --- | --- |
| 536,537 | Great Britain | May 19, 1941 |